United States Patent [19]

Ito et al.

[11] Patent Number: 4,628,005
[45] Date of Patent: Dec. 9, 1986

[54] HEAT WAVE SHIELDING LAMINATION

[75] Inventors: Tadayoshi Ito; Taga Yasunori, both of Aichi, Japan

[73] Assignee: Kabushiki Kaisha Toyoto Chuo Kenkyusho, Aichi, Japan

[21] Appl. No.: 678,704

[22] Filed: Dec. 6, 1984

[30] Foreign Application Priority Data

Dec. 9, 1983 [JP] Japan .................................. 58-233224

[51] Int. Cl.$^4$ ............................................. G02B 1/10
[52] U.S. Cl. ............................ 428/432; 428/698;
428/700; 428/701; 427/469; 427/472
[58] Field of Search ............... 428/432, 700, 701, 698, 428/699; 427/34, 250, 255, 469, 471, 472

[56] References Cited

U.S. PATENT DOCUMENTS

| 2,676,117 | 4/1954 | Colbert et al. | 428/432 |
| 3,738,732 | 6/1973 | Ikeda | 428/432 X |
| 3,853,386 | 12/1974 | Ritter et al. | 428/701 X |
| 3,934,961 | 1/1976 | Itoh et al. | 428/701 X |
| 4,160,061 | 7/1979 | Okino et al. | 428/432 X |
| 4,187,336 | 2/1980 | Gordon | 428/701 X |
| 4,382,995 | 5/1983 | Lin | 428/701 X |

FOREIGN PATENT DOCUMENTS 0181503 11/1982 Japan .................................. 428/698

Primary Examiner—Nancy A. B. Swisher
Attorney, Agent, or Firm—Koda and Androlia

[57] ABSTRACT

A heat wave shielding lamination having improved abrasion resistance is composed of a visible light transparent substrate and an overlying composite lamination in which layers of a visible light transparent substance of a low refractive index and layers of a visible light transparent substance of a high refractive index are alternately arranged on each other, with the topmost layer being a low-refractance layer, and interfacial layers of $Al_2O_3$ which are much thinner than the high-refractance and low-refractance layers are provided between the high-refractance and low-refractance layers.

4 Claims, 4 Drawing Figures

F I G. 3
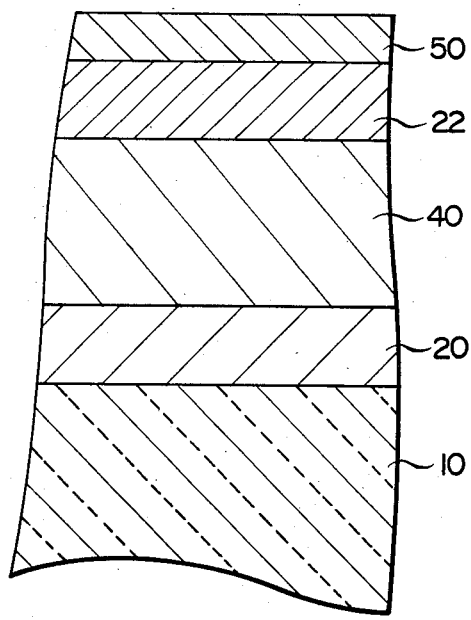

HEAT WAVE SHIELDING LAMINATION

BACKGROUND OF THE INVENTION

1. Field of the Invention

This invention relates to a heat wave shielding lamination, and more particularly to an improved heat wave shielding lamination comprising a plurality of thin layers laminated on the surface of a visible light transparent substrate.

2. Description of the Prior Art

Progress is being made in the development and practical application of heat wave shielding laminations consisting of thin layers of visible light transmitting material of a high refractive index alternating with those of a low refractive index formed on the surface of a visible light transparent substrate of glass or plastic. Because of their excellent transparency to visible light and their outstanding heat wave reflection characteristics, such heat wave shielding laminations are expected to be widely used on the window glass of automobiles or of buildings and in a wide range of other fields.

However, a drawback with the conventional heat wave shielding laminations has been that they did not provide the abrasion-resistance required for practical application, and because of this efforts to apply conventional heat wave shielding laminations have been extremely limited to such uses as heat shields in electronic copying machines and other such applications where the conditions of use are not so stringent. It has not been possible to apply such laminations to the windows of automobiles or of buildings owing to their lack of sufficient abrasion-resistance. For the same reason it was not possible to apply such laminations to plastic substrate materials.

Specifically, to use such heat wave shielding laminations for the windows of automobiles, they are required to pass the Taber abrasion test, one of the durability tests stipulated by JIS for automobile window glass. Evaluation of the abrasion resistance is on the basis of the haze value obtained after the test, and it is laid down in the JIS standard that the amount of abrasion measured thus must not exceed 2%.

However, in the actual testing of conventional heat wave shielding laminations interlayer peeling occurred at the interface between the high-refraction and low-refraction films, resulting in haze values in excess of 2% and therefore precluding the use of such laminations for the windows of automobiles.

Furthermore, in order to improve their abrasion-resistance conventional heat wave shielding laminations, together with their glass substrate, were subjected to heat treatment at high temperatures of around 500°–600° C. or more. However, such high-temperature heat treatment could not be applied to the window glass of automobiles, to spectacle or camera lenses or to substrates of plastic, and this formed an obstacle to the practical utilization of heat wave shielding laminations.

SUMMARY OF THE INVENTION

The object of the present invention is therefore to provide a heat wave shielding lamination which has sufficient abrasion-resistance without the need to resort to high-temperature heat treatment.

This object of the present invention is attained by providing a heat wave shielding lamination comprising a visible light transparent substrate and an overlying composite lamination in which layers of visible light transparent substance of a low refractive index and layers of visible light transparent substance of a high refractive index are alternately on each other, and interfacial layers of $Al_2O_3$ which are much thinner than the high-refractance and low-refractance layers are provided between the high-refractance and low-refractance layers, thereby increasing the abrasion-resistance of the lamination.

A heat wave shielding lamination constituted thus in accordance with this invention is able to provide sufficient abrasion-resistance without the need of any high-temperature heat treatment and can be practically utilized for the windows of automobiles or of buildings, spectacle lenses, plastic substrates and other such purposes.

BRIEF DESCRIPTION OF THE DRAWINGS

FIG. 3 is an explanatory view for the purpose of comparing constructions.

DESCRIPTION OF THE PREFERRED EMBODIMENTS

In a heat wave shielding lamination according to the present invention there are provided a visible light transparent substrate, and on the heat source side thereof, an overlying composite lamination consisting of at least two layers of visible light transparent substance of a low refractive index and at least two layers of visible light transparent substance of a high refractive index alternately lying on each other, with the topmost layer being a low-refractance layer.

In the embodiment of this invention the visible light transparent substrate is formed of glass, plastic or the like. Each high-refractance film is formed of a material selected from $TiO_2$, $CeO_2$, $ZnS$, $CdS$ and $ZrO_2$ and is thick enough to reflect infrared rays. Each low-refractance film is formed of a material selected from $SiO_2$, $MgF_2$, $LiF$, $CeF_3$ or $CaF_2$ and is thick enough to reflect infrared rays. It is preferable that the topmost layer of a heat wave shielding lamination be the low-refractance film selected from $SiO_2$, $MgF_2$, $LiF$, $CeF_3$ and $CaF_2$ and is thick enough to prevent reflection of visible light.

A heat wave shielding lamination thus constituted in accordance with this invention exhibits excellent visible light transparency and heat wave reflection characteristics, and is characterized by the provision of a thin layer of $Al_2O_3$ along the interface between the high-refractance films and the low-refractance films.

This invention provides a heat wave shielding lamination with a greatly improved abrasion-resistance and hardly any degradation in its visible light transparency or heat wave reflection characteristics.

Also, because in this invention the above-mentioned optical characteristics and abrasion-resistance can be obtained with films formed on the surface of the substrate at an appropriate temperature that is not higher than 200° C., the lamination can be easily formed on the windows of automobiles or of buildings, or on the lenses of spectacles and cameras and on plastic and other substrates which formerly involved problems because of the need for high-temperature heat treatment.

Also, by providing at the interface between the low refractance film and the high refractance film an interfacial layer of a refractance more or less midway between said low and high refractances, there is an easing of visible light interferential reflection arising in each layer of the lamination, providing improved visible light transparency and greater brightness.

EXAMPLES

Figure 1:
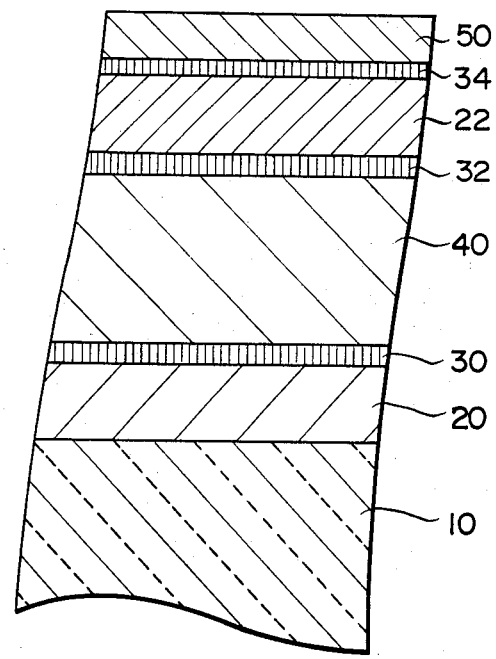
FIG. 1 is an explanatory view of the preferred embodiment of the heat wave shielding lamination according to this invention.

FIG. 1 shows an embodiment of the heat wave shielding lamination according to the present invention. As shown, the lamination consists of $TiO_2$ high refractance film layers 20, 22 and a $SiO_2$ low refractance film layer 40, these layers being overlayed alternately on the heat source side of a substrate 10 which is an automobile window pane 5 mm in thickness with a refractive index of 1.50 and which is transparent to light in the visible and infrared zones of the spectrum. The topmost layer is a $SiO_2$ low refractance film 50 formed as an interferential reflection prevention layer.

The interfacial layers 30, 32, 34 are provided at the interface between the high refractance films 20, 22 and the low refractance films 40, 50. The heat wave shield of this embodiment therefore consists of a 7-layer lamination, these being the high refractance films 20, 22, the low refractance films 40, 50 and the interfacial layers 30, 32, 34 disposed therebetween.

In order that the thus-formed heat wave shielding lamination satisfies the JIS abrasion-resistance requirements stipulated for window glass of automobiles without degradation of the optical characteristics, i.e. transparency to visible light and heat wave reflectance, it is necessary to decide the thickness of each of the films 20, 22, 30, 32, 34, 40, 50 and the material of the interfacial layers 30, 32, 34 on the basis of the following considerations.

Specifically, it is necessary to decide the optimum thickness of the $TiO_2$ high refractance films 20, 22 and the low refractance films 40, 50 and that of the $SiO_2$ film, on the basis of the refractive index of the substance from which the film interlayers 30, 32, 34 are formed, and the thickness thereof, with the aim of preventing degradation of the optical characteristics accompanying the presence of said interlayers.

In addition, the material selected for use as the interfacial layers 30, 32, 34 and the thickness of these layers must be such as to conform to the JIS abrasion-resistance standard laid down for glass for use in automobiles. In this invention, in order to satisfy such requirements the interfacial layers 30, 32, 34 are formed of $Al_2O_3$. Computer simulation techniques were used to decide the following thickness of each of the films 20, 30, 40, 32, 22, 34, 50 forming the lamination, taking into account the measured refractive indexes of the $TiO_2$, $SiO_2$ and $Al_2O_3$ films and the wavelength ($\lambda = 1,000$ nm) at the center of the infrared spectrum at which interferential reflection occurs.

The thickness of the $TiO_2$ high-refractance films 20, 22 was set at $101\pm5$ nm, that of the $SiO_2$ low-refractance film 40 was set at $155\pm8$ nm and that of the topmost $SiO_2$ low-refractance film 50 at $82\pm4$ nm. The thickness of the $Al_2O_3$ interfacial layers 30, 32, 34 formed at the interface between the $TiO_2$ and $SiO_2$ films was set at $10\pm0.5$ nm.

RF sputtering was used as follows to form the heat wave shielding lamination of this embodiment. The substrate 10 is cleaned ultrasonically with an organic solvent such as isopropyl and this is followed by the use of RF sputtering in a vacuum chamber to thoroughly remove any surface spots or stains. The high-refractance films 20, 22, the low-refractance films 40, 50 and the interfacial films 30, 32, 34 are then laminated on the surface of the substrate one after the other, in the order 20, 30, 40, 32, 22, 34, 50. More specifically, the $TiO_2$ high-refractance film 20 was formed by the RF sputtering of a $TiO_2$ target in an argon atmosphere containing 5% oxygen and having an overall pressure of $2.0\times10^{-2}$ Torr, without any special heating of the substrate.

This was followed by the formation of the $Al_2O_3$ interfacial layer, using an $Al_2O_3$ target and performed under the same formation conditions used to form the high-refractance film 20 and without even breaking the vacuum. This was then followed by the formation of the $SiO_2$ low-refractance film 40, using an $SiO_2$ target and the same formation conditions and vacuum employed for the $TiO_2$ and $Al_2O_3$ films. By repeating this RF sputtering formation process the heat-source side of the substrate 10 was overlaid by the $TiO_2$ high-refractance films 20, 22, the $Al_2O_3$ *interfacial layers* 30, 32, 34 *and the SiO2* low-refractance films 40, 50, providing a 7-layer $TiO_2$/$Al_2O_3$/$SiO_2$ lamination without any special heating of the substrate.

As the heat wave shielding lamination of this invention does not require high-temperature heat treatment, it is possible to apply it practically in a wide range of fields in which such utilization was formerly not possible because of the high-temperature heat treatment which was involved.

Figure 2:
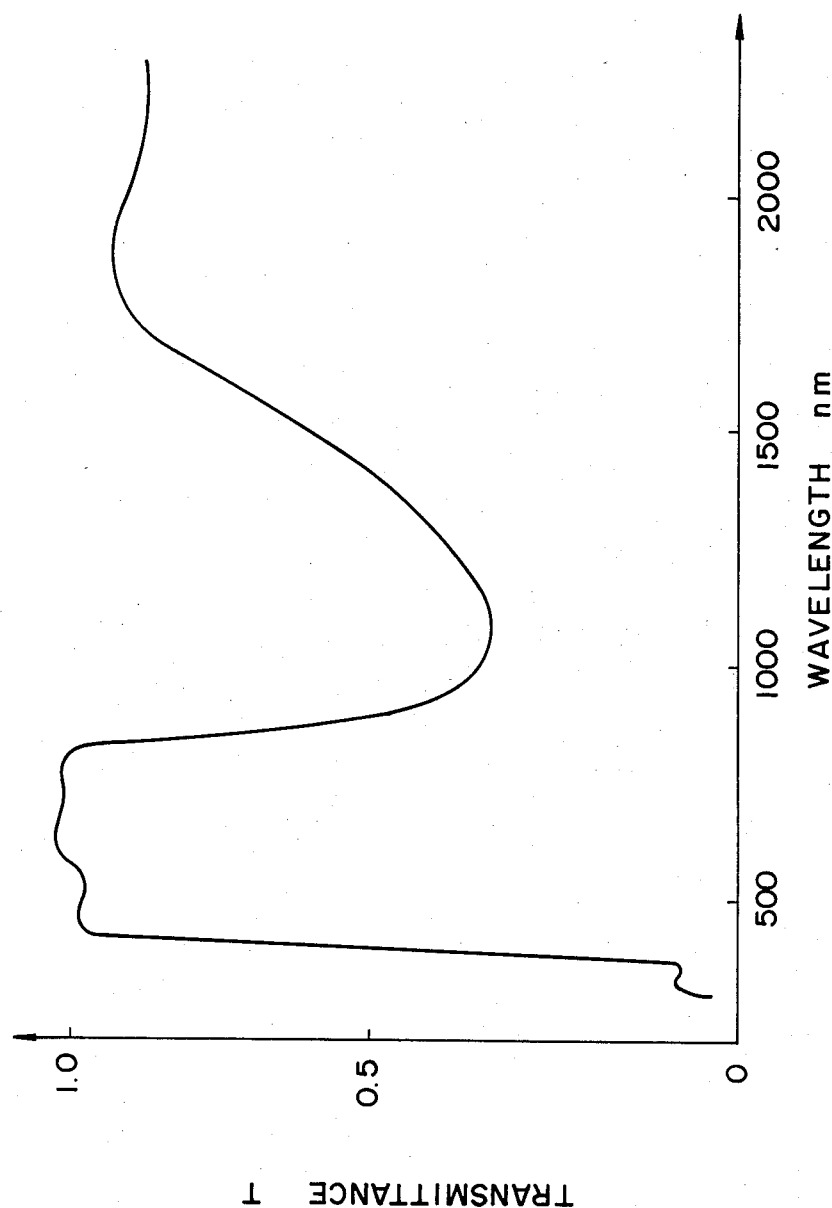
FIG. 2 is a graph showing spectral characteristics of the heat wave shielding lamination of FIG. 1.

The spectral transmittance characteristics of a heat wave shielding lamination formed according to this embodiment are shown in FIG. 2, which shows clearly that the heat wave shielding lamination of this embodiment has good transmittance for visible light.

The lamination of this embodiment was next subjected to the abrasion test used for glass for use in the windows of automobiles. The Taber abrasion test method was employed for this purpose, and a haze meter used to assess the resistance to abrasion. A Teledyne Taber Abraser was used to perform the test in accordance with the JIS standard conditions (Abraser CS-10F; load of 1 kg; 1,000 abrasions). Measurement with the haze meter following the test showed a haze value of 1.9% for the heat wave shielding lamination of this embodiment. The glass substrate was also subjected to the Taber test under the same conditions and showed a haze value of 1%.

The possible reason for this improvement in anti-abrasion properties is that the Taber test stipulated by JIS can be considered as being a form of scratch test, in which case it follows that there is a correlation between the hardness of the load-bearing layer and its anti-abrasion properties. It is well known that $Al_2O_3$, with a Mohs' hardness of 9, is much harder than $TiO_2$, which has a Mohs' hardness of 6, or $SiO_2$, which has a Mohs' hardness of 7. This means that while $TiO_2$ and $SiO_2$ are both considered as normally strong enough to withstand ordinary abrasion, by interposing therebetween $Al_2O_3$, which is harder than $TiO_2$ and $SiO_2$, the load is supported by this hard $Al_2O_3$ layer, providing the overall lamination with greater resistance to abrasion.

This being the case, it can be considered that if instead of interposing $Al_2O_3$ layers at all the interfaces, as shown by 30, 32, 34 in FIG. 2 of this embodiment, the layers 32, 34 were to be omitted and just the Al₂O₃ layer 34 interposed to support the load directly, a similar improvement in the anti-abrasion properties of the TiO₂/SiO₂ lamination should be obtained. In fact, it was confirmed that providing the lamination with just the Al₂O₃ layer 34 resulted in anti-abrasion properties that were far better than those exhibited by a TiO₂/SiO₂ lamination.

In the JIS standard for window glass for automobiles it is stipulated that the haze value as measured following the specified Taber test shall not exceed 2%. Therefore the automobile glass overlaid with the heat wave shielding lamination of this embodiment fully meets the abrasion-resistance requirements laid down by JIS so the lamination is utilizable as a heat wave shielding on automobile window glass.

COMPARATIVE EXAMPLE

The characteristics of the heat wave shielding lamination according to this invention will now be described in comparison with the conventional heat wave shielding lamination. The 4-layer conventional heat wave shielding lamination shown in FIG. 3 consists of the same TiO₂ high-refractance films 20, 22 and SiO₂ low-refractance films 40, 50 as those of the embodiment of FIG. 1 laminated on the heat-source side of the same glass substrate 10. The method of forming the films 20, 40, 22, 50 is also the same one as that of the embodiment of this invention, with the thickness of the TiO₂ high-refractance films 20, 22 set at 103±5 nm and that of the SiO₂ low-refractance films 40, 50 set at 172±8 nm and 86±4 nm, respectively.

Figure 4:
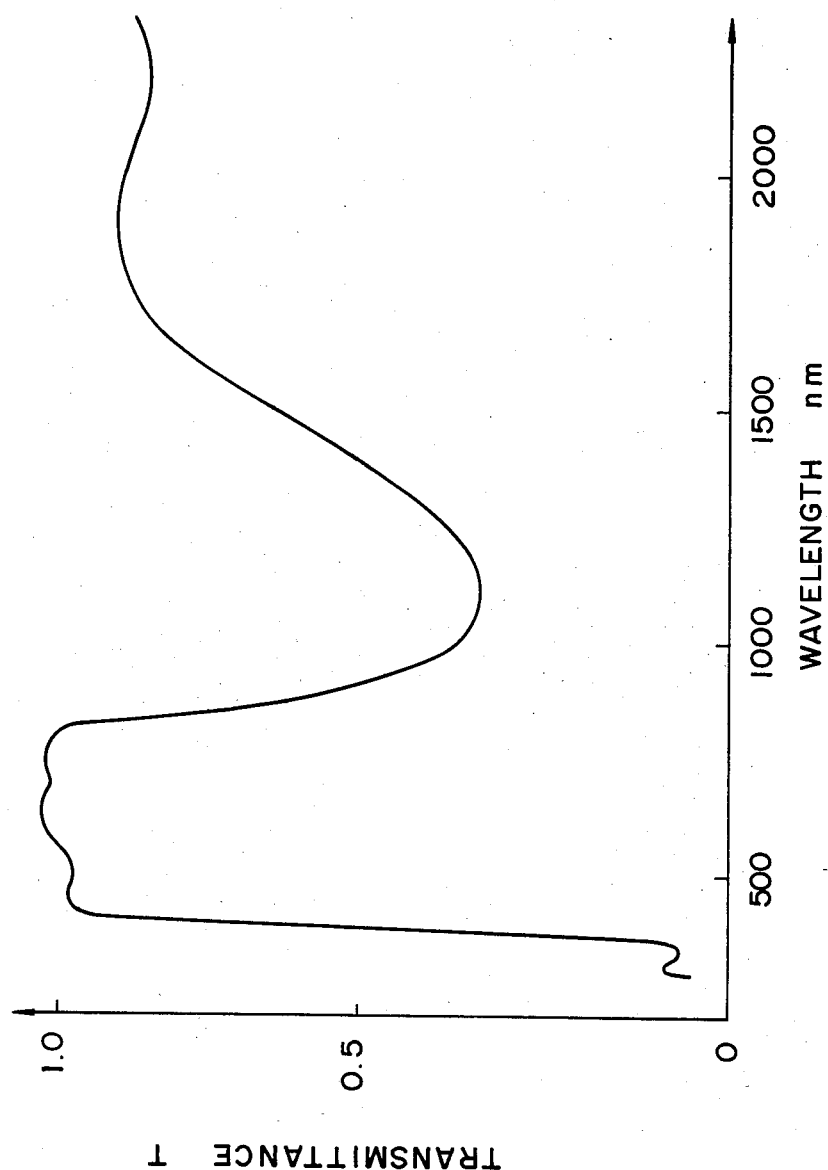
FIG. 4 is a graph showing spectral characteristics of the heat wave shielding lamination of FIG. 3.

FIG. 4 shows one of the spectral characteristics of the lamination of FIG. 3, specifically, its transmittance relative to wavelength. From FIG. 4 it can be seen that these transmittance characteristics are almost identical with those of the lamination of the present invention as shown in FIG. 2. Thus, even though in this invention an interfacial layer is provided between the high-refractance and low-refractance films, there is no degradation in the spectral characteristics of the lamination of this embodiment, said spectral characteristics being substantially the same as those of the conventional heat wave shielding lamination.

The conventional heat wave shielding of FIG. 3 was subjected to the same JIS abrasion test conditions as the lamination of this embodiment. This resulted in a haze value of 3.5% for the conventional lamination, confirming that it did not possess the requisite resistance to abrasion specified by JIS for the window glass of automobiles. The heat wave shielding lamination according to this invention, on the other hand, has far better abrasion resistance than the conventional lamination while maintaining almost identical spectral characteristics, fully confirming its practical utility for the window glass of automobiles.

As described in the foregoing, the heat wave shielding lamination according to this invention fully confirms to the JIS standard relating to the abrasion-resistance of automobile window glass without any degradation in spectral characteristics, specifically the transparency to visible light and heat wave shielding characteristics.

Compared with the above-described conventional heat wave shielding lamination the lamination of this embodiment has more layers because of the provision of the Al₂O₃ at the interface between the TiO₂ and the SiO₂ layers, and it might be thought that this could have an adverse effect on the productivity rate thereof. However, because the Al₂O₃ is so extremely thin the time needed for its formation is negligible compared with the time required for the formation of the TiO₂ and SiO₂ layers, and as such there would be hardly any effect on the productivity rate.

Furthermore, because the lamination according to this invention can be formed without any heat treatment of the substrate at high temperatures in excess of 200° C., the lamination can be formed on plastic and other such substrates which cannot be subjected to high-temperature heat treatment. Moreover, the excellent abrasion-resistance of the lamination of this invention can be assumed to derive from the delicate interface structure between the high-refractance and low-refractance layers, and not in the kind of diffusion zones produced between high-refractance and low-refractance films which have been subjected to high-temperature heat treatment. Because of this, the lamination of this invention is applicable not only to the windows of automobiles and buildings but to many other product areas, such as scratch-prevention coatings for spectacle and camera lenses, anti-glare coatings, and the like; and when it has been provided with greater strength and improved spectral characteristics, the lamination of this invention will have an extremely wide range of applicability.

Also, because the abrasion-resistance of the heatwave shielding lamination of this invention resides in the delicate structure of the interface between the high-refractance film layers and the low-refractance film layers, not in the mutual diffusion zones of the interface, ordinary vacuum deposition, ion plating, sputtering, chemical vapor deposition, cluster ion beam and other such manufacturing methods can be used in addition to the above-mentioned RF sputtering.

As will be clear from the above description, the present invention relates to a heatwave shielding lamination which is provided with sufficient optical characteristics and ample resistance to abrasion without resort to special high-temperature heat treatment by the formation of a prescribed interfacial layer at the interface between the high-refractance layers and the low-refractance layers. It is feasible therefore that the lamination thus constituted may be utilized practicably for a wide range of purposes.

What is claimed is:

1. A heat wave shielding lamination having improved abrasion resistance, without effecting its optical characteristics, comprising: a visible light transparent substrate; and an overlying composite lamination consisting of at least two layers of visible light transparent substance of a low refractive index and at least two layers of visible light transparent substance of a high refractive index lying alternately on each other, with the topmost layer being said low-refractive layer, and at least one interfacial layer of Al₂O₃ provided between said high-refractance and low-refractance layers, said interfacial layer being much thinner than said high-refractance and low-refractance layers with the thickness of the interfacial layer being in the range of 5–20 nm said high-refractance layers being formed of a material selected from TiO₂, CeO₂, ZnS, CdS and ZrO₂, each of which being thick enough to reflect infrared rays, and said low-refractance layers being formed of a material selected from SiO₂, MgF₂, LiF, CeF₃ and CaF₂, the top most layer thereof being of a thickness which prevents reflection of visible light and other layers thereof being thick enough to reflect infrared rays.

2. A heat wave shielding lamination according to claim 1, wherein said interfacial layer of $Al_2O_3$ is provided between the uppermost high-refractance and low-refractance layers.

3. A heat wave shielding lamination according to claim 1, wherein said interfacial layer of $Al_2O_3$ is provided at each interface between said high-refractance and low-refractance layers.

4. A heat wave shielding lamination according to claim 1, wherein said visible light transparent substance is formed of glass or plastic.

* * * * *

UNITED STATES PATENT AND TRADEMARK OFFICE
CERTIFICATE OF CORRECTION

PATENT NO. : 4,628,005
DATED : December 9, 1986
INVENTOR(S) : Tadayoshi Ito et al It is certified that error appears in the above—identified patent and that said Letters Patent is hereby corrected as shown below:

Title Page:

At [73] Assignee: change "Kabushiki Kaisha Toyota Chuo Kenkyucho" to --Kabushiki Kaisha Toyota Chuo Kenkyusho--.

Signed and Sealed this

Thirteenth Day of October, 1987

Attest:

DONALD J. QUIGG

Attesting Officer

Commissioner of Patents and Trademarks